(12) United States Patent
Gilbertson

(10) Patent No.: US 10,660,410 B2
(45) Date of Patent: May 26, 2020

(54) FOOT IMPRESSION DEVICE, SYSTEM, AND RELATED METHODS

(71) Applicant: Glenn M. Gilbertson, Evergreen, CO (US)

(72) Inventor: Glenn M. Gilbertson, Evergreen, CO (US)

(*) Notice: Subject to any disclaimer, the term of this patent is extended or adjusted under 35 U.S.C. 154(b) by 0 days.

(21) Appl. No.: 16/555,466

(22) Filed: Aug. 29, 2019

(65) Prior Publication Data

US 2019/0380448 A1 Dec. 19, 2019

Related U.S. Application Data

(63) Continuation of application No. 15/843,431, filed on Dec. 15, 2017, now abandoned.

(60) Provisional application No. 62/435,175, filed on Dec. 16, 2016.

(51) Int. Cl.

| | | |
|---|---|---|
| *A43D 1/02* | (2006.01) |
| *B29C 33/38* | (2006.01) |
| *B33Y 50/00* | (2015.01) |
| *B29C 64/386* | (2017.01) |
| *B29L 31/00* | (2006.01) |
| *B33Y 80/00* | (2015.01) |
| *B29L 31/50* | (2006.01) |
| *A43B 7/14* | (2006.01) |

(52) U.S. Cl.
CPC .......... *A43D 1/022* (2013.01); *B29C 33/3821* (2013.01); *B29C 33/3857* (2013.01); *B29C 64/386* (2017.08); *B33Y 50/00* (2014.12); *A43B 7/141* (2013.01); *A43D 1/025* (2013.01); *A43D 2200/60* (2013.01); *B29C 2033/3871* (2013.01); *B29L 2031/50* (2013.01); *B29L 2031/753* (2013.01); *B33Y 80/00* (2014.12)

(58) Field of Classification Search
CPC ..................................................... A43D 1/022
See application file for complete search history.

(56) References Cited

U.S. PATENT DOCUMENTS

| | | | | |
|---|---|---|---|---|
| 2,057,039 A | * | 10/1936 | MacDonald | A43D 1/022 264/223 |
| 2,517,902 A | * | 8/1950 | Luebkeman | B22C 9/10 264/221 |
| 2,581,489 A | * | 1/1952 | Kilham | A43D 1/022 425/2 |

(Continued)

*Primary Examiner* — Matthew J Daniels
*Assistant Examiner* — Andrew D Graham
(74) *Attorney, Agent, or Firm* — Schneider IP Law LLC; Laura A. Schneider

(57) ABSTRACT

An impression device has a base having a recess and a conduit for fluidly coupling the recess to a vacuum source configured to temporarily apply a vacuum pressure to the recess. The device has a first plurality of particles positioned in the recess, the first plurality of particles sealed from an external environment and consisting essentially of a plurality of circular glass beads. The device has a flexible membrane coupled to the base adjacent to the first plurality of particles and holding the first plurality of particles in the base. The first plurality of particles has a first coefficient of friction between each other selected to allow the particles to move relative to each other in the absence of the vacuum pressure and to prevent the particles from moving relative to each other in the presence of the vacuum pressure.

15 Claims, 6 Drawing Sheets

(56) References Cited

U.S. PATENT DOCUMENTS

| | | | | |
|---|---|---|---|---|
| 2,613,398 A * | 10/1952 | Croweil | B29C 33/3821 | 264/517 |
| 3,325,341 A * | 6/1967 | Shannon | C04B 38/0038 | 428/406 |
| 3,515,267 A * | 6/1970 | Larocca | B65D 81/09 | 206/584 |
| 3,520,656 A * | 7/1970 | Yates | C01B 32/956 | 423/345 |
| 3,586,645 A * | 6/1971 | Granger et al. | C08J 9/04 | 521/78 |
| 3,690,903 A * | 9/1972 | Thomka | B65D 75/305 | 426/105 |
| 3,703,572 A * | 11/1972 | Bellasalma | B29C 33/0016 | 264/510 |
| 3,908,644 A * | 9/1975 | Neinart | A43D 1/022 | 602/8 |
| 3,914,369 A * | 10/1975 | Modic | B29C 33/3857 | 264/225 |
| 3,962,395 A * | 6/1976 | Hagglund | A43B 7/28 | 264/517 |
| 4,347,213 A * | 8/1982 | Rogers, Jr. | A61F 5/01 | 264/510 |
| 4,454,618 A * | 6/1984 | Curchod | A43D 1/022 | 12/1 R |
| 4,876,758 A * | 10/1989 | Rolloff | A43B 7/28 | 12/142 N |
| 4,906,425 A * | 3/1990 | Poussou | A61B 17/2256 | 264/102 |
| 4,952,355 A * | 8/1990 | Seward | B29C 33/3814 | 249/134 |
| 5,102,604 A * | 4/1992 | Sidles | B29C 43/10 | 264/257 |
| 5,228,164 A * | 7/1993 | Graf | A43D 1/022 | 12/133 R |
| 5,262,121 A * | 11/1993 | Goodno | B29C 33/3821 | 156/156 |
| 5,275,775 A * | 1/1994 | Riecken | A61F 5/14 | 12/142 N |
| 5,282,328 A * | 2/1994 | Peterson | A43D 1/022 | 36/140 |
| 5,351,830 A * | 10/1994 | Bender | B65D 81/051 | 206/522 |
| 5,556,169 A * | 9/1996 | Parrish | A42B 3/121 | 297/452.28 |
| 7,674,419 B2 * | 3/2010 | Thompson | A43D 1/022 | 264/223 |
| 8,808,598 B1 * | 8/2014 | Meyer | A61F 5/14 | 264/220 |
| 9,295,576 B2 * | 3/2016 | Boone | A61B 5/1038 | |
| 9,460,557 B1 * | 10/2016 | Tran | B29C 64/386 | |
| 9,996,981 B1 * | 6/2018 | Tran | A43D 1/025 | |
| 10,136,703 B2 * | 11/2018 | Gooch | A43D 8/00 | |
| 2001/0002232 A1 | 5/2001 | Young | A43D 1/025 | 409/132 |
| 2002/0195220 A1 * | 12/2002 | Jacobson | B29C 33/3821 | 164/15 |
| 2005/0035477 A1 * | 2/2005 | Jacobson | B29C 33/308 | 264/37.1 |
| 2006/0015050 A1 * | 1/2006 | Bleau | A43B 7/141 | 602/28 |
| 2009/0183388 A1 * | 7/2009 | Miller | A43B 7/141 | 36/43 |
| 2009/0313853 A1 * | 12/2009 | Tadin | A43B 3/0005 | 36/91 |
| 2013/0149428 A1 * | 6/2013 | Pitts | B05B 1/00 | 427/1 |
| 2013/0184374 A1 * | 7/2013 | Rich | B29C 44/5618 | 523/218 |
| 2014/0104395 A1 * | 4/2014 | Rohaly | G01B 11/165 | 348/47 |
| 2018/0168288 A1 * | 6/2018 | Gilbertson | B29C 33/3821 | |

* cited by examiner

FOOT IMPRESSION DEVICE, SYSTEM, AND RELATED METHODS

PRIORITY

The present Application for Patent claims priority to U.S. patent application Ser. No. 15/843,431 entitled "FOOT IMPRESSION DEVICE, SYSTEM, AND RELATED METHODS," FILED Dec. 15, 2017, which claims priority to Provisional Application No. 62/435,175 entitled "FOOT IMPRESSION DEVICE, SYSTEM, AND RELATED METHODS," filed Dec. 16, 2016. The entire contents of these applications are hereby expressly incorporated by reference herein.

FIELD

The present disclosure relates to orthotics. In particular, but not by way of limitation, the present disclosure relates to systems and methods for taking an impression of a foot or other anatomical feature.

SUMMARY

An exemplary impression device has a base having a recess and a conduit for fluidly coupling the recess to a vacuum source configured to temporarily apply a vacuum pressure to the recess. A first plurality of particles is positioned in the recess, the first plurality of particles sealed from an external environment and consisting essentially of a plurality of circular glass beads. A flexible membrane is coupled to the base adjacent to the first plurality of particles and holds the first plurality of particles in the base. The first plurality of particles has a first coefficient of friction between each other, the first coefficient of friction selected to allow the particles to move relative to each other in the absence of the vacuum pressure and to prevent the particles from moving relative to each other in the presence of the vacuum pressure.

An exemplary method of taking an impression of an anatomical feature includes providing a foot impression device, applying a first vacuum pressure to the first plurality of particles, and applying a second vacuum pressure to the first plurality of particles, the second vacuum pressure different from the first vacuum pressure.

An exemplary method of making an orthotic, providing an exemplary impression device, causing the first plurality of particles and the membrane to form about a portion of an anatomical feature, applying a first vacuum pressure to the first plurality of particles, and applying a second vacuum pressure to the first plurality of particles, the second vacuum pressure different from the first vacuum pressure, whereby an impression of the anatomical feature is created in the membrane. The exemplary method includes using a 3D scanner to scan the impression, and, responsive to the using the 3D scanner to scan, at least one of 3D printing an orthotic, CNC machining an orthotic, 3D printing a mold for an orthotic, or CNC machining a mold for an orthotic.

DETAILED DESCRIPTION

Figure 1:
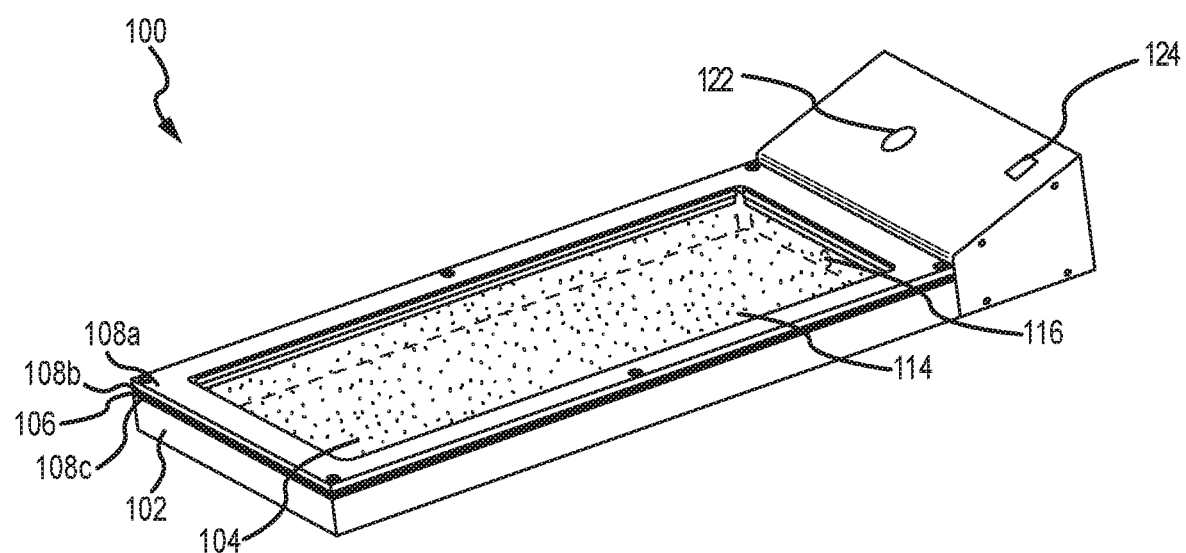
FIG. 1 illustrates a perspective view of an exemplary impression device according to some embodiments.
Figure 2:
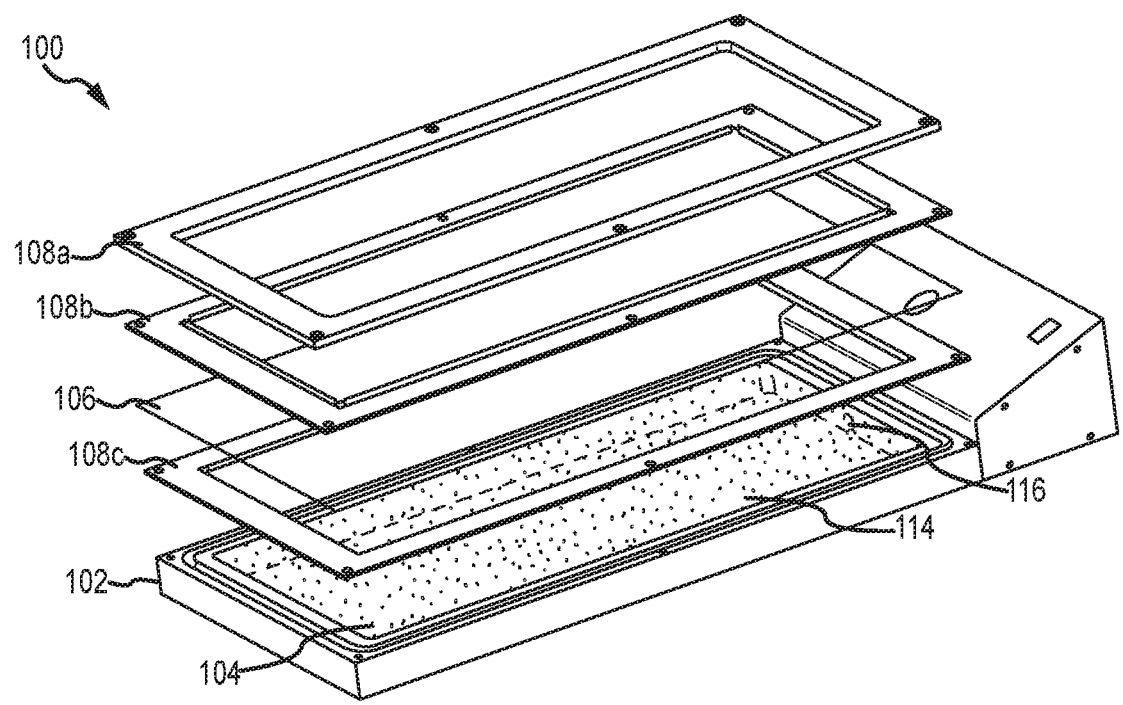
FIG. 2 illustrates an exploded perspective view of the device in FIG. 1.
Figure 4:
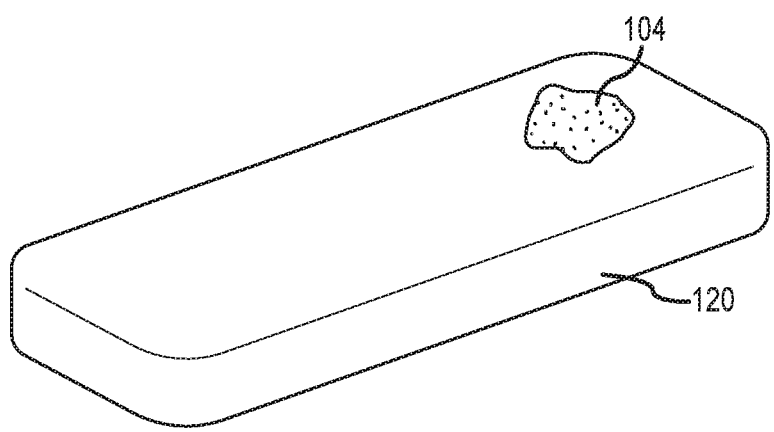
FIG. 4 illustrates an exemplary pouch suitable for use in the device in FIG. 1.
Figure 5:
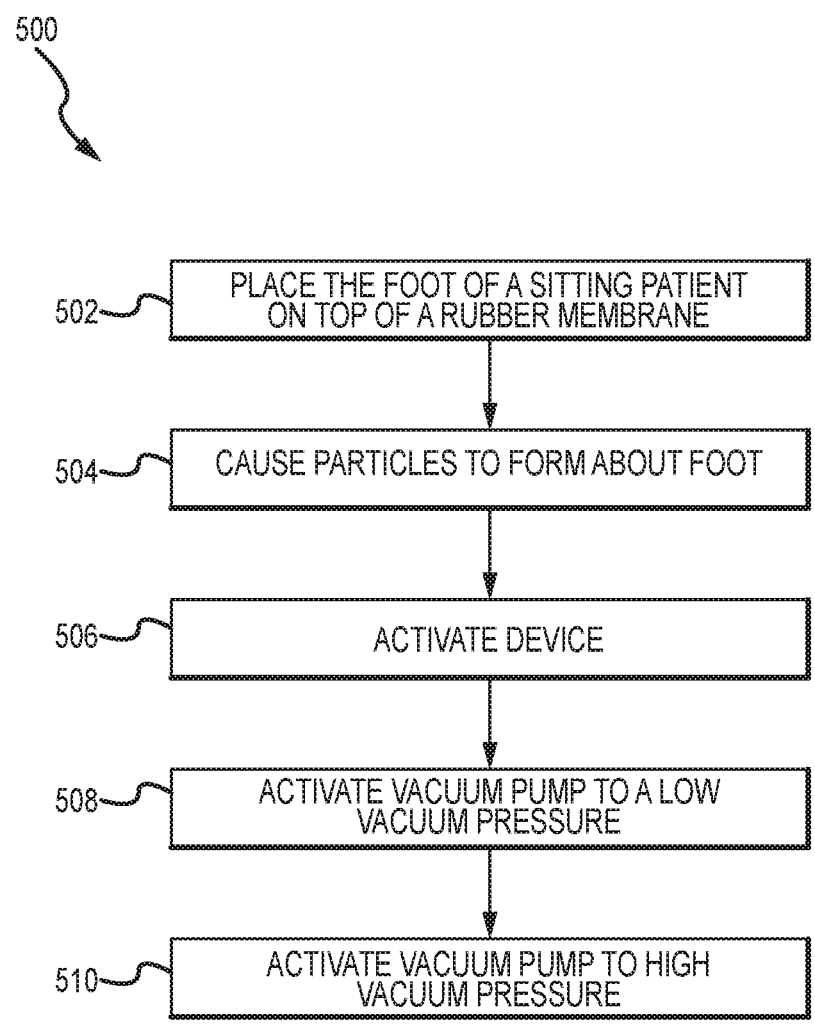
FIG. 5 is a flow chart of an exemplary method.
Figure 6:
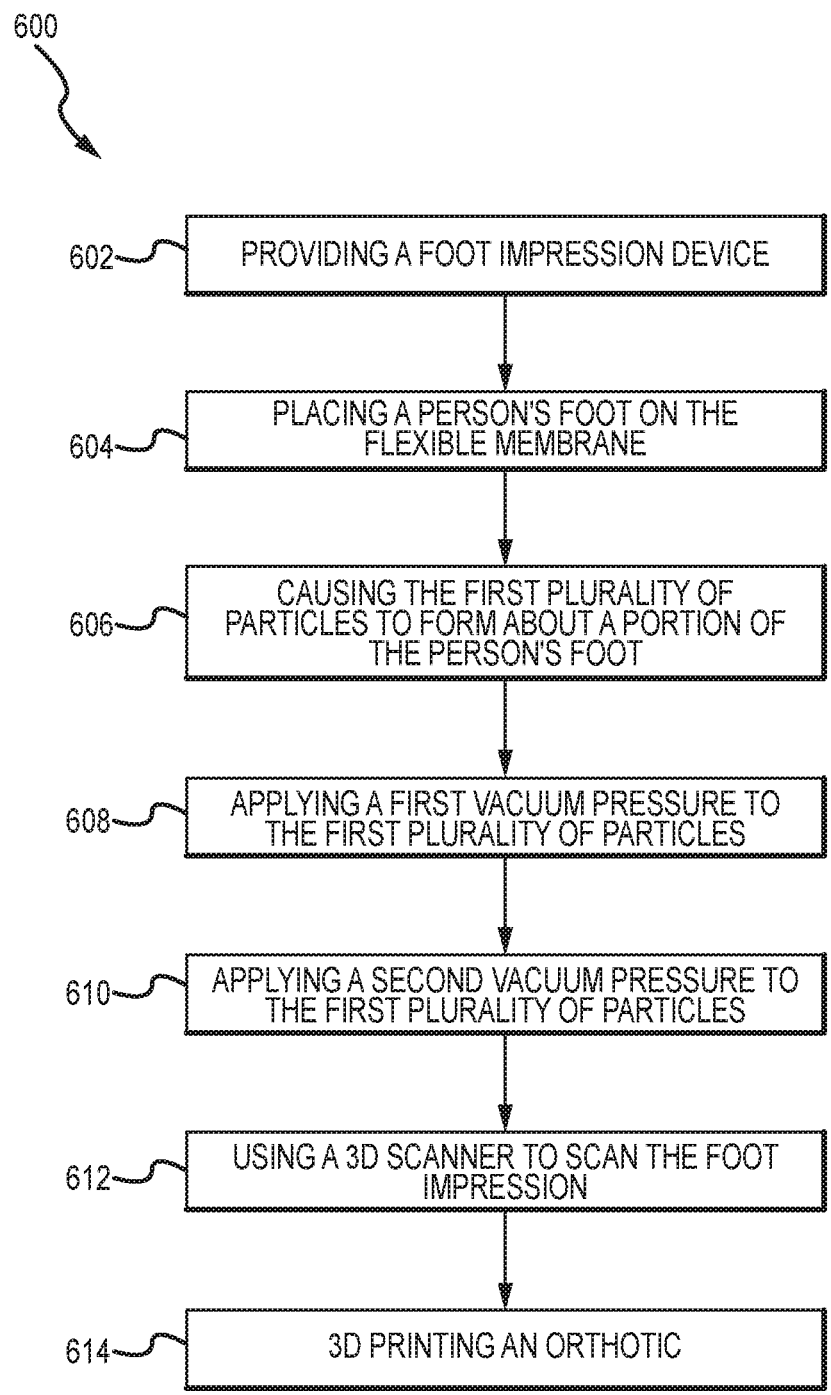
FIG. 6 is a flow chart of an exemplary method.

As illustrated in FIG. 1, the impression device 100 may provide a user or physician with the ability to capture the complete contour of an anatomical feature of a person or animal, such as a person's foot in a smooth, organic manner. For the purpose of this document, the terms "foot" and "anatomical feature" may be used interchangeably. The device 100 may have a base 102 with a recess 114 for receiving a plurality of particles 104. The particles 104 may be enclosed or held in the recess 114 by way of a pouch 120 (see e.g. FIG. 4) and/membrane 106. The process may provide the practitioner with a simple means to position the anatomical feature or foot in an anatomically correct alignment, readjusting as necessary and quickly through the use of vacuum pressure, and creating a 3D impression. This impression may then be scanned, to become the source data for subsequent editing and final manufacture of an orthotic, which may include CNC machining, CNC milling, CNC turning, or 3D printing of the orthotic. The entire shaping, scanning, and manufacture process may, in some embodiments, take place in the practitioner's office and/or within a matter of hours, such as 8 hours or less, or 5 hours or less, or 2 hours or less, or 1 hour or less. In some embodiments, the process of placing the foot, forming the membrane, and scanning to form and impression may take 30 minutes or less, or about 20 minutes or less.

In some embodiments, the impression device 100, such as the device in FIG. 1, is configured to create an impression of a foot or anatomical feature. For example, a plurality of particles 104, which may be spherical, may be contained in a containment pouch 120 (see FIG. 4) that is placed underneath a membrane. In some embodiments, the particles 104 may be placed in a recess 114 in the base 102, with a membrane 106 provided to isolate the particles 104 from the external environment and/or the foot. The membrane 106 may be held in position or coupled to the base 104 by way of a membrane positioning system. The membrane positioning system may include one or more framing features 108a, 108b, 108c and/or fasteners for holding the membrane 106 in place and/or providing a seal between the membrane 106 and the base 102. Those skilled in the art will readily recognize that the membrane frames 108b and/or 108c may not be necessary. For example, silicone rubber tubing embedded in channels at the top of the base and/or bottom of the lid 108a may create an adequate seal. That is, any means for providing a vacuum about the particles 104 may be provided.

Those skilled in the art will also readily recognize that the device 100 may include any suitable means 122, 124 for operating the vacuum device such as a vacuum pressure adjustment valve 122 and/or power switch 124, or other monitoring means.

Figure 3:
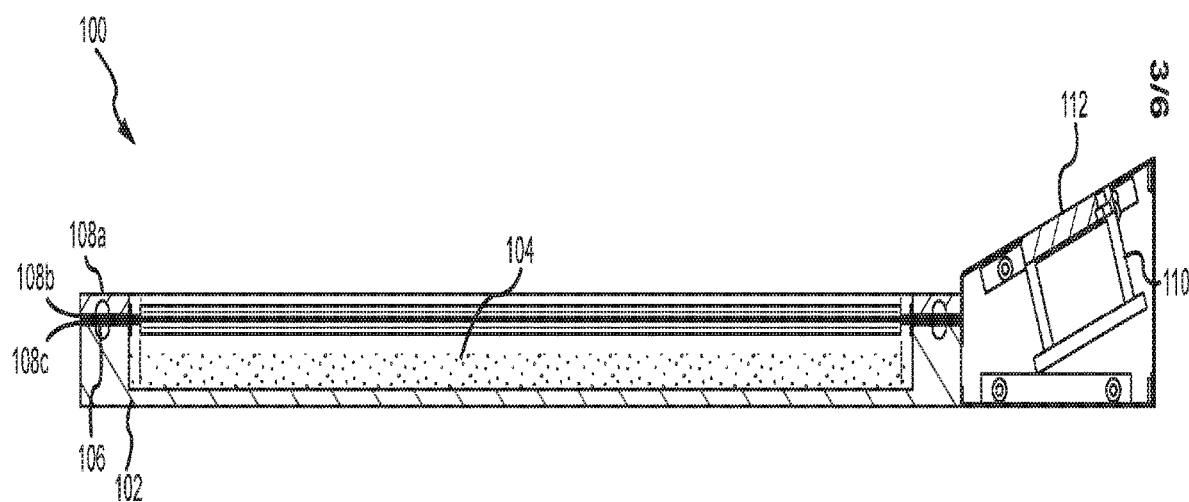
FIG. 3 illustrates an exploded side section view of the device in FIG. 1.

After a person steps on the membrane 106, the clinician may move or manipulate the membrane 106, portions of the containment pouch 120 (where available, see FIG. 4), and/or spherical particles 104 about, so as to conform to a bottom portion of the anatomical feature or foot. The vacuum pump 112 may then be actuated to remove air from the recess 114, such as through a conduit 116 provided between the vacuum and the recess 114 or area containing the particles 104. The vacuum pump 112 may be positioned inside the base 102 and held in position by a support 110 (see FIG. 3), or the pump 112 may be external to the device 100. Actuation of the vacuum pump 112 may stabilize the particles 104. That is, the pump 112 may hold the particles 104 in position even after the foot is removed. The foot may then be withdrawn from the device 100, leaving the containment pouch and/or membrane 106 with the impression of the foot. The impression may then be scanned, using, for example, any commercial 3D scanner.

Those skilled in the art will readily recognize that the membrane 106 may be unitary with a wall or portion of the pouch 120 in some examples.

In some embodiments, the vacuum pump 112 may be configured to cause the particles 104 to have, essentially, the consistency of wet sand at a first vacuum pressure. In some embodiments, the vacuum pump 112 may be configurable by a user to cause the particles to have a first desired consistency set to the user's preferences. For example, if the user is using the device 100 to take an impression of a horse's hoof, a denser consistency may be desired.

In some embodiments, the vacuum pump 112 may be configured to cause the particles 104 to have a second consistency at a second vacuum pressure, different from the first consistency. The second consistency may be a "soft set" that is firm enough to maintain the shape caused by the impression of the anatomical feature, but also soft enough to allow the user to re-form to his or her preference after the anatomical feature is removed.

In some embodiments, the vacuum pump 112 may be configured to cause the particles 104 to have a third consistency at a third vacuum pressure, different from the first and second consistencies. The third consistency may be a "concrete set" that is substantially immovable, and suitable for 3D scanning.

In some embodiments, the vacuum pump 112 may have an infinite number of pressure settings. That is, the pump 112 may allow a user to adjust the pressure infinitely to achieve a desired consistency before, during, or after taking an impression of an anatomical feature.

In some embodiments, the membrane 106 is provided so as to provide a smoothly-shaped impression that requires little or no manual shaping after the 3D printing process. In some embodiments, the membrane 106 is provided to protect the containment pouch 120 (where provided).

In some embodiments, the containment pouch 120 is replaceable. In some embodiments, the containment pouch 120 is removable. The containment pouch 120 may be removable using standard tooling, or a specialized tool may be required to prevent inadvertent tampering. In some embodiments, the membrane 106 is replaceable. In some embodiments, the membrane 106 is removable. The membrane 106 may be removable using standard tooling, or a specialized tool may be required to prevent inadvertent tampering.

In some embodiments, the particles 104 may be spherical, and may have an average diameter of about 1 millimeter. In some embodiments, the spherical particles 104 have an average diameter of between about 0.8 millimeters and about 1.2 millimeters. In some embodiments, the spherical particles 104 are between about 0.7 millimeters and about 1.4 millimeters. In some embodiments, the spherical particles 104 are glass beads. In some embodiments, the spherical particles 104 are soda-lime glass beads. In some embodiments, the spherical particles are made of a plastic, such as Nylon. Other materials are also contemplated. In some embodiments, the spherical particles 104 are selected to have a frictional engagement with each other that is high enough to maintain the formed shape after the vacuum pump is activated and the foot is withdrawn, but low enough to allow the spheres to be manipulated or moved to form about the foot. In some embodiments, the spherical particles 104 are made of glass.

In some embodiments, the device 104 may be configured to handle a particular weight range of a person. For example, pediatric, small adult, large adult, and other versions may be provided. In some embodiments, spherical particles 104 in a pediatric version may have a lower coefficient of friction than, for example, those found in a large adult version, to ease formation of the membrane and containment pouch. In some embodiments, a plurality of interchangeable containment pouches having spherical particles customized for the intended use with differently sized patients may be provided as a part of a system with the device, so that the clinician does not have to maintain multiple units on-site.

In some embodiments, a method 500 of making an orthotic impression is provided. The method 500 may include placing 502 the foot of a sitting patient on top of a rubber membrane of a device substantially as previously described herein. The method 500 may also include rocking the foot side to side, and/or sinking 504 the foot that is on top of the rubber into a bed of forming spheres within the containment pouch. The method may include, after causing the foot to sink, activating 506 the device. Activating 506 the device may include turning the device to an on or ready state.

The method may include activating 508 the vacuum pump to a LOW vacuum pressure. The LOW vacuum pressure may cause a vacuum in the box cavity and the enclosed containment pouch. The resulting rubber/pouch/spheres take on the form of the foot and the spheres may become the consistency of wet sand. That is, while the foot is still in the formed cavity, the sphere consistency and LOW vacuum pressure allow for additional shaping and alignment of the impression by the clinician.

The method 500 may further include activating 510 the vacuum pump to a HIGH vacuum pressure. Activating to a HIGH vacuum pressure may occur after the final shaping is complete using the LOW vacuum pressure. The HIGH vacuum pressure may be selected to set the spheres to a concrete-like hardness.

The method may include removing the foot.

The method may include taking a 3D scan of the formed membrane while the device is activated to a HIGH vacuum pressure. The 3D scan may be accomplished using a 3D hand-held scanner, such as within about 10 seconds.

The method may include saving a scanned image for CAD editing. The method may include CAD editing of the scanned image.

The method 500 may include deactivating the vacuum pump, thereby allowing the spheres to return to a relaxed state, ready for another cycle.

In some embodiments, a method 600 of making an orthotic is provided. The method 600 may include providing 602 a foot impression device, such as the device 100 described herein. The method 600 may include placing 604 a person's foot on the flexible membrane, causing 606 the first plurality of particles to form about a portion of the person's foot, applying 608 a first vacuum pressure to the first plurality of particles, and applying 610 a second vacuum pressure to the first plurality of particles, the second vacuum pressure different from the first vacuum pressure, whereby a foot impression is created. The method 600 may include using 612 a 3D scanner to scan the foot impression, and 3D printing 614 an orthotic. The method 600 may include using a 3D printer or CNC machine or CNC milling machine to print or form an orthotic according to the scanned 3D image, a CAD-edited version of the scanned 3D image, or both. The method may include printing an orthotic within one day of taking an impression of a foot. The method may be achieved using, for example, the device or system previously described herein.

The method may include using a CNC machine to form the orthotic in conformity with the scanned 3D image, a CAD-edited version of the scanned 3D image, or both. The method may be achieved using, for example, the device or system previously described herein.

The terms and expressions employed herein are used as terms and expressions of description and not of limitation, and there is no intention, in the use of such terms and expressions, of excluding any equivalents of the features shown and described or portions thereof. In addition, having described certain embodiments, it will be apparent to those of ordinary skill in the art that other embodiments incorporating the concepts disclosed herein may be used without departing from the spirit and scope of the disclosure. Accordingly, the described embodiments are to be considered in all respects as only illustrative and not restrictive.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this disclosure is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of an actuator should be understood to encompass disclosure of the act of actuating—whether explicitly discussed or not—and, conversely, were there only disclosure of the act of actuating, such a disclosure should be understood to encompass disclosure of an actuating mechanism. Such changes and alternative terms are to be understood to be explicitly included in the description.

The previous description of the disclosed embodiments and examples is provided to enable any person skilled in the art to make or use the present disclosure as defined by the claims. Thus, the present disclosure is not intended to be limited to the examples disclosed herein. Various modifications to these embodiments will be readily apparent to those skilled in the art, and the generic principles defined herein may be applied to other embodiments without departing from the spirit or scope of the invention as claimed.

What is claimed is:

1. An impression device, comprising:
   a base having a recess and a conduit for fluidly coupling the recess to a vacuum source, the vacuum source configured to temporarily apply a vacuum pressure to the recess by removing air from the recess;
   the recess housing a mixture consisting essentially of a first plurality of particles and air, the first plurality of particles and air sealed from an external environment, the first plurality of particles consisting essentially of a plurality of circular glass beads;
   a flexible membrane coupled to the base adjacent to the first plurality of particles and holding the air and the first plurality of particles in the base; and
   a first pouch enclosing the first plurality of particles and positioned in the recess and underneath the membrane; wherein
   the first plurality of particles has a first coefficient of friction between each other, the first coefficient of friction selected to allow the particles to move relative to each other in the absence of the vacuum pressure and to prevent the particles from moving relative to each other in the presence of the vacuum pressure; and wherein
   in the absence of the vacuum pressure, the flexible membrane and first plurality of particles are configured to conform to a bottom portion of an anatomical feature pressed onto the flexible membrane.

2. The device of claim 1, further comprising:
   a second pouch enclosing a second plurality of particles; wherein
   the second plurality of particles has a second coefficient of friction between each other, the second coefficient of friction different from the first coefficient of friction, the first coefficient of friction selected to move in response to a first weight range applied to the membrane, the second coefficient of friction selected to move in response to a second weight applied to the membrane.

3. The device of claim 1, wherein:
   the first plurality of particles has an average diameter of between about 0.7 millimeters and about 1.4 millimeters.

4. The device of claim 3, wherein:
   the average diameter is between about 0.8 millimeters and about 1.2 millimeters.

5. The device of claim 1, further comprising:
   a vacuum pump fluidly coupled to the recess, the vacuum pump configured to apply the vacuum pressure, the vacuum pressure having a first vacuum pressure and a second vacuum pressure, the first vacuum pressure different from the second vacuum pressure.

6. The device of claim 5, wherein:
   the first vacuum pressure is configured to cause the first plurality of particles to have a soft set wherein the first plurality of particles is biased to maintain their position relative to each other during application of the first vacuum pressure; and
   the second vacuum pressure is configured to cause the first plurality of particles to achieve a concrete set wherein the first plurality of particles is substantially immovable relative to each other.

7. The device of claim 1, further comprising:
   a 3D scanner configured to scan the shape of the membrane during the temporarily applying the vacuum pressure to the recess; and
   an orthotic manufacture mechanism configured to receive a source data from the 3D scanner and to CNC machine, CNC mill, or 3D print the orthotic based on the source data.

8. A method of taking an impression of an anatomical feature, the method comprising:
   providing a foot impression device, the foot impression device having a base having a recess and a conduit for fluidly coupling the recess to a vacuum source, the vacuum source configured to temporarily apply a vacuum pressure to the recess, the recess housing a mixture consisting essentially of air and a first plurality of particles, and a flexible membrane coupled to the base and adjacent the first plurality of particles and holding the air and the first plurality of particles in the base, the first plurality of particles sealed from an external environment and consisting essentially of a plurality of circular glass beads, wherein the first plurality of particles have a first coefficient of friction between each other, the first coefficient of friction selected to allow the particles to move relative to each other in the absence of the vacuum pressure and to prevent the particles from moving relative to each other in the presence of the vacuum pressure, and wherein in the absence of the vacuum pressure, the flexible membrane and first plurality of particles are configured to conform to a bottom portion of an anatomical feature pressed onto the flexible membrane;

providing a first pouch enclosing the first plurality of particles;

causing the first plurality of particles to form about a portion of an anatomical feature;

applying a first vacuum pressure to the first plurality of particles; and applying a second vacuum pressure to the first plurality of particles, the second vacuum pressure different from the first vacuum pressure.

9. The method of claim 8, further comprising:

providing a second pouch enclosing a second plurality of particles; wherein the second plurality of particles have a second coefficient of friction between each other, the second coefficient of friction different from the first coefficient of friction.

10. The method of claim 9, wherein:
the first plurality of particles has an average diameter of between about 0.7 millimeters and about 1.4 millimeters.

11. The method of claim 10, wherein:
the average diameter is between about 0.8 millimeters and about 1.2 millimeters.

12. A method of making an orthotic, the method comprising:
providing an impression device as claimed in claim 1;
causing the first plurality of particles and the membrane to form about a portion of the anatomical feature;
applying a first vacuum pressure to the first plurality of particles; and
applying a second vacuum pressure to the first plurality of particles, the second vacuum pressure different from the first vacuum pressure, whereby an impression of the anatomical feature is created in the membrane;
using a 3D scanner to scan the impression; and
responsive to the using the 3D scanner to scan, at least one of 3D printing an orthotic, CNC machining an orthotic, 3D printing a mold for an orthotic, or CNC machining a mold for an orthotic.

13. The method of claim 12, further comprising:
providing a second pouch enclosing a second plurality of particles; wherein
the second plurality of particles have a second coefficient of friction between each other, the second coefficient of friction different from the first coefficient of friction.

14. The method of claim 12, wherein:
the first plurality of particles has an average diameter of between about 0.7 millimeters and about 1.4 millimeters.

15. The method of claim 14, wherein:
the average diameter is between about 0.8 millimeters and about 1.2 millimeters.

* * * * *